United States Patent [19]

Williamson

[11] Patent Number: 4,770,252

[45] Date of Patent: Sep. 13, 1988

[54] HARROW

[75] Inventor: Wilfred G. Williamson, Lethbridge, Canada

[73] Assignee: Airmaster Sales Ltd., Winnipeg, Canada

[21] Appl. No.: 15,366

[22] Filed: Feb. 17, 1987

Related U.S. Application Data

[63] Continuation of Ser. No. 799,504, Nov. 19, 1985, Pat. No. 4,685,524.

[51] Int. Cl.⁴ .................. A01B 19/06; A01B 35/24
[52] U.S. Cl. .................................. 172/54.5; 172/643
[58] Field of Search ............ 172/643, 707, 710, 54.5, 172/96, 142, 719, 254, 643, 68, 102; 56/400, 400.02, 366, 365, 367

[56] References Cited

U.S. PATENT DOCUMENTS

| | | | |
|---|---|---|---|
| 1,978,717 | 10/1934 | Oppenheim | 56/400 |
| 2,206,612 | 7/1940 | Linaberry | 56/400.02 |
| 2,764,922 | 10/1956 | Carnall | 172/96 |
| 3,026,667 | 3/1962 | Morrison | 56/400 |
| 3,463,239 | 8/1969 | Lindeman | 56/400 |
| 3,566,974 | 3/1971 | Kopaska | 172/643 |
| 3,631,929 | 1/1972 | Gates | 172/707 |
| 3,910,019 | 10/1975 | Schlittler | 56/367 |
| 4,265,186 | 5/1981 | Nichols | 172/54.5 |

FOREIGN PATENT DOCUMENTS 745671  2/1956  United Kingdom .............. 172/54.5

Primary Examiner—Richard J. Johnson
Attorney, Agent, or Firm—Adrian D. Battison; Stanley G. Ade

[57] ABSTRACT

A tine mounting arrangement for a harrow provides a transverse elongate support member with a plurality of stub shafts extending outwardly therefrom in the same horizontal plane at an angle of 45°. Each stub shaft carries a pair of spring tines with the springs wrapped around the shaft and an inclined portion of the tine extending forwardly from the angled shaft and therefore at an angle to the transverse support member. Two such members can be mounted on pivot arms to provide a transverse reciprocating working action of the tines. This harrow element can be mounted upon support arms pivoted from a draw bar and carried on ground wheels which may be simple depth wheels or may form packer wheels. In an alternative arrangement the packer wheels and harrow element are mounted on a subframe which can be reversed so that the packers operate in advance of the harrow element.

10 Claims, 2 Drawing Sheets

HARROW

BACKGROUND OF THE INVENTION

This application is a continuation of co-pending application Ser. No. 799,504, filed Nov. 19, 1985 and now issued to U.S. Pat. No. 4,685,524 on Aug. 11, 1987.

This invention relates to a harrow and particularly but not excusively to one which is reciprocatingly driven in a direction transverse to the general direction of motion of the harrow to work the harrow tines on the ground as the harrow moves forwardly.

Various designs of reciprocating or "live" harrows have been developed over the years and recently more attention has been given to this type of equipment in view of changes to farming methods which have often required an improved harrow action in trashy soils and an improved working of the soil for incorporation of chemicals. Devices of this type are shown for example in U.S. Pat. Nos. 503,434, 1,327,424, 1,544,564, 3,422,907 and 3,499,494. These devices include a support bar for the harrow tines which is arranged to reciprocate longitudinally that is transverse to the direction of motion of the harrow.

However none of these devices has been entirely satisfactory and there remains a requirement for an improved harrow.

SUMMARY OF THE INVENTION

It is one object of the present invention, therefore, to provide an improved harrow in which the harrow tines are mounted in a new and unique manner which provides a number of significant advantages.

According to a first aspect of the invention, therefore, there is provided a harrow comprising frame means arranged for attachment to transport means whereby the frame means can be moved across the ground in a direction of movement, an elongate support member, means mounting said support member in an orientation such that it extends and arranged to maintain said support member in said orientation on the frame means at right angles to the direction of motion, a plurality of tine support bars each fixedly mounted on said support member in spaced relation along the elongate support member and each having one end attached to the support member so that an opposed free end thereof extends outwardly from the support member to define a tine supporting section of each tine supporting bar arranged at an angle different from ninety degrees to the support bar and to the direction of motion, and a plurality of spring tines each comprising a flexible coiled spring portion defining an axis around which it is coiled and arranged for engaging around a respective one of the tine support sections such that the axis of the spring portion lies at said angle of said support section and a tine portion depending downwardly from the spring portion for engaging the ground in a harrowing action.

This unique mounting of the tines on respective ones of a plurality of angled support bars provides a number of advantages. Firstly, the tines can be readily removed from the support bars without interfering with other tines on the support member. In many cases two such tines can be provided on each support bar but can be readily attended to without interfering with any other of the tines.

Secondly the angling of the support bars provides an angling of the tine itself that is the coil spring providing the conventional flexibility and also the spring tine portion itself. Thus the spring is angled to the direction of motion and provides a new and effective kicking action as the tine is flexed and released by the varying levels of soil which it encounters.

These advantages are obtained either with the support member stationary or with it reciprocated. Preferably therefore the member is reciprocated longitudinally and this can provide a third advantage, particularly when there are two tines on each support bar in that the transverse movement and the angled position of the two tines on each bar acts to feed trash material past the bars thus assisting to prevent any blocking or clogging of the tines with the trash.

A further object of this invention is to provie an improved harrowing and packing arrangement particularly for use with a driven line harrow.

The mounting of the packer wheels and harrow support member on the same subframe enables the reversal of that subframe so that either the ground can be worked firstly by the packer wheels and subsequently by the harrow or vice versa. Such an arrangement is unique and provides for the farmer opportunity to work his soil in varying manner depending upon particular requirements including the preferred manner of seeding and the level of trash in the soil.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
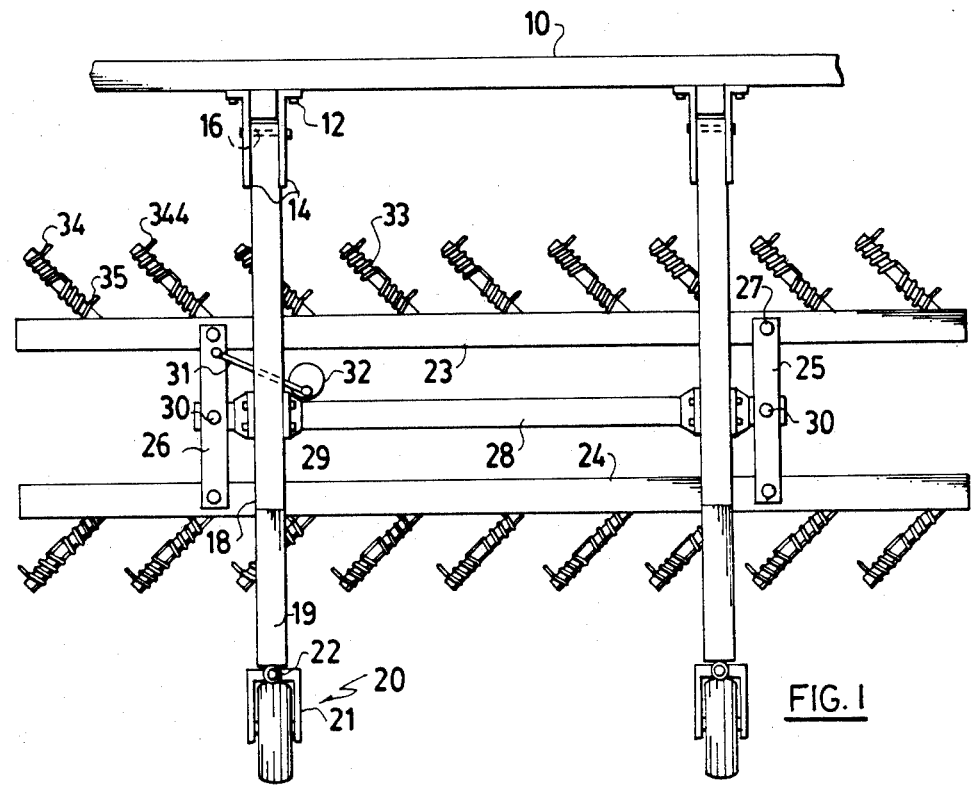
FIG. 1 is a plan view of a harrow according to the invention.
Figure 2:
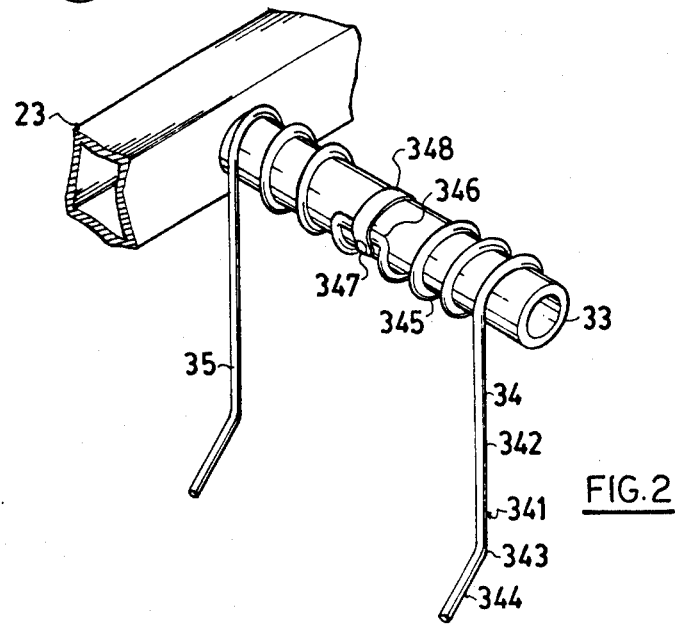
FIG. 2 is an enlarged isometric view of one tine support bar of the harrow of FIG. 1.
Figure 3:
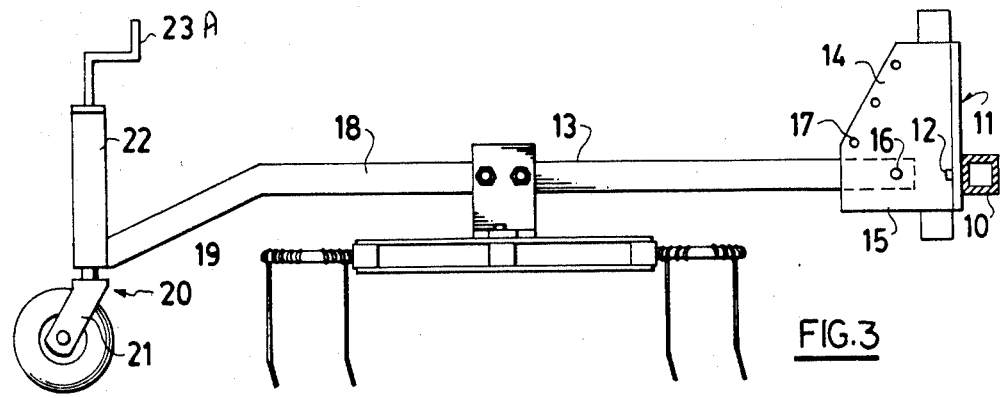
FIG. 3 is a side elevational view of the harrow of FIG. 1.

Turning firstly to the embodiment shown in FIGS. 1, 2 and 3, there is shown a draw bar 10 of any suitable equipment which may itself be a harrow draw bar for solely drawing the harrow of the present invention or it may be a draw bar of a cultivator or a discer or similar equipment depending upon farming requirements. A support bracket generally indicated at 11 is arranged for attachment to the draw bar 10 by bolts 12 and provides a short length channel for receiving an elongate support member or strut 13. Thus the channel provides a pair of sides 14 and a base 15 for supporting an inner end of the strut 13 relative to a pivot pin 16. Thus the member or strut 13 extends directly rearwardly from the draw bar 10 and can be pivoted about the pin 16 from the normal working position shown in FIG. 3 to a raised position and held in that position by a suitable pin passing through one of the holes 17 defined in an upper part of the sides 14.

The arm 13 defines a first horizontal portion 18 and a rear downwardly inclined portion 19 which interconnects the arm to a ground wheel generally indicated at 20. The ground wheel is carried in a yoke 21 pivoted in a vertical sleeve 22 the height of which can be adjusted by a crank 23A in conventional manner. Thus adjustment of the crank 23A acts to raise and lower the substantially horizontal portion 18 of the arm for raising and lowering the harrow mechanism supported by the arm 13 and described hereinafter.

The harrow comprises a pair of transverse elongate support members 23 and 24 which are effectively equal in length and arranged one in front of the other. The transverse members 23 and 24 are pivotally supported on forwardly extending pivot arms 25, 26 with suitable bearings 27 to allow the transmission of movement from the pivot arms while retaining the transverse members 23, 24 substantially rigid and horizontal. The pivot arms 25, 26 are in turn supported on a main strut 28 which is carried on the arms 18 by suitable U brackets 29. Further bearings 30 between the main strut 28 and the pivot arms 27 allow the pivot arms 25, 26 to pivot in a horizontal plane about the bearings 30 under motive power provided by a strut 31 and eccentric 32 connected between the main strut 28 and the pivot arm 26. In FIG. 1, the eccentric is shown at the centre of a stroke and thus the pivot arms are at right angles to the support members 23, 24 so it will be appreciated that rotation of the eccentric 32 under power from a suitable motor will cause the support members 23 and 24 to reciprocate along their length in opposed phased through a stroke determinend by the diameter of the eccentric 32.

Each of the support members 23,34 carries a plurality of tine support bars 33 each carrying a pair of tines 34, 35. Each of the tine support bars 33 is of tubular cylindrical form welded to one face of the member 23 as best shown in FIG. 2. In addition each is arranged in a horizontal plane and at an angle to the member 23 of the order of 45°. As shown in FIG. 1 the bars 33 extend forwardly and leftwardly of the member 23 and extend rearwardly and leftwardly of the member 24. However this arrangement can be altered so that the bars are rearwardly of or forwardly of the bars 23, 24 as required and they can, as required, extend either to the left or to the right.

Each tine 34, 35 comprises a depending tine portion 341 which commences substantially vertically downwardly at 342 and it includes a cranked elbow 343 defining a forwardly inclined portion 344. The depending tine portion is integral with a helical spring portion 345 which is wound to define an axis generally at right angles to the depending portion 342. In addition the elbow 343 defines a bend in a direction such that the whole of the depending tine portion 341 lies in a plane at right angles to the axis of the spring portion 345. The diameter of the spring portion 345 is slightly greater than the outside diameter of the tube or support bar 33 so that it can slide onto the support bar 33 and be received therearound as a loose fit. As will be noted from FIG. 2, the spring portion of the tine 34 is arranged as a right hand winding and the spring portion of the tine 35 is arranged as a left hand winding so that the tines are arranged at opposed ends of the bar 33 with the springs leading therefrom toward a central area. At the central area each of the spring portions includes an axially turned clamping section 346 which is clamped to the outer surface of the tube by a bolt 347 and plate 348. Thus the end of the spring portion remote from the tine portion is rigidly clamped to the tube 33 allowing the tine portion to flex around the axis defined by the spring portion so as to tighten the spring portion down towards the tube. The number of turns in the spring portion is preferably of the order of 5 and the diameter is chosen relative to the diameter of the tube to allow a significant degree of tightening of the spring portion generally greater than that of conventional tines in view of the large degree of deflection of the tine portion which can occur in this arrangement.

It will be appreciated, as shown best in FIG. 1, that as the tine is mounted upon the angled bar 33, the forwardly inclined portion 344 of each of the tines is not directed in the direction of motion but at an angle thereto and is at 45° thereto on the opposite side to the angle of the bar 33. In operation this angle provides a surprising and novel effect in that even with the members 23, 24 stationary, the tines tend to deflect rearwardly parallel to the direction of motion that is out of the plane of the tine portion. When released by the soil, the tine tends to spring both axially along the bar 33 and radially around the bar 33 thus providing an improved kicking action of the tine in the soil.

It will be noted that the diameter of the eccentric 32 is less than the spacing of the tines 34, 35 in the direction of the member 23. Thus the stroke of movement of the member 23 will be less than the spacing of the tines so that their action does not overlap on the ground as the ground moves past the tines in the direction of motion. Furthermore it will be noted that the length of and spacing of the bars 33 relative to the member 23 is such that the tine 35 at the base of the bar 33 is positioned approximately midway between the tines 34 of two adjacent bars which are of course positioned at the outer or free end of the bars 33.

The tines can of course be simply removed from the harrow without interfering with the tines of any other bar 33 simply by removing the bolt 347 and the bracket 348 to release the spring portions for removal of the tines along the bar 33.

When the members 23 and 24 are in motion under power from the eccentric 32, a leftward movement of the bar 33 acts to feed trash material past the tines and a rightward movement acts to draw remaining trash forwardly in front of the tines. Thus the reciprocating movement acts to effectively spread the trash and to feed it through in portions in the manner of a ratchet. Of course the tines of the member 24 operate in a similar manner rearwardly of or sequentially of the tines of the member 23 thus providing a double effect on the trash to provide an effective fluffing or spreading of the trash over the ground.

Figure 4:
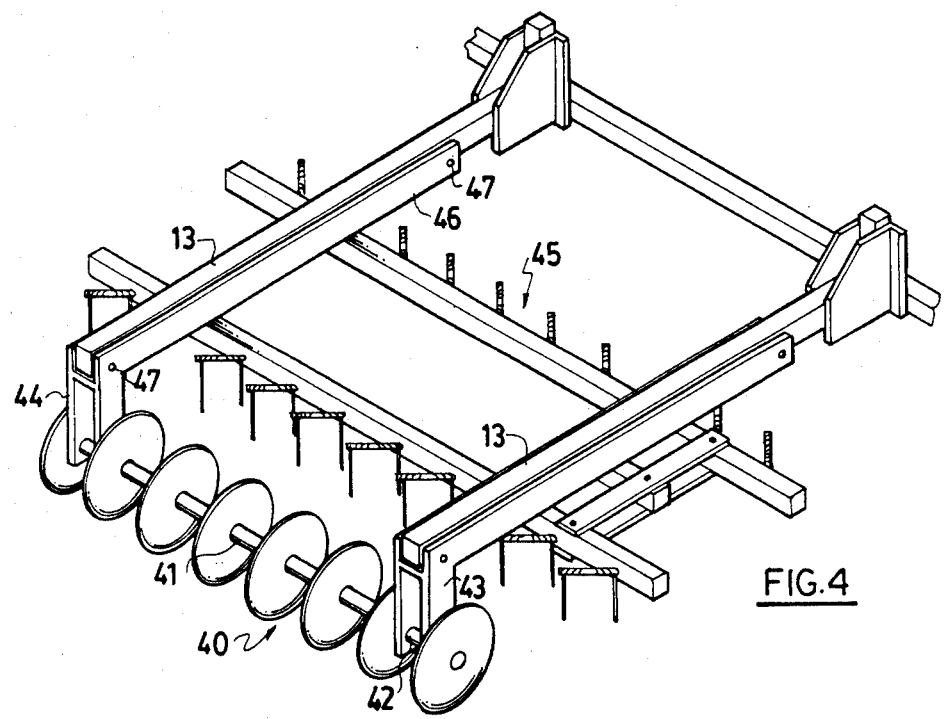
FIG. 4 is an isometric view of a modified harrow according to the present invention.

Turning now to FIG. 4, there is shown a modified arrangement incorporating the following modifications.

Firstly the ground wheels 20 are replaced by a plurality of packer wheels 40 of conventional form mounted upon a rod 41 for rotation about bearings 42 carried by depending arms 43, 44. Thus in place of the simple depth wheels 20, a packing action across the full width of the implement is obtained by the packer wheels 40.

Secondly the wheels 40 and the harrow element are no longer directly connected to the arms. In this embodiment the harrow element generally indicated at 45 and the struts 43, 44 are connected to a channel member 46 which in turn is connected to the arm 13 by setting the arm 13 in the base of the channel member 46 and then passing pins or bolts 47 through both to interconnect the channel and arm. It will be noted that the channel is symmetrical and thus can be reversed in its position on the arm 13 so that the packer wheels 40 are placed ahead of the harrow element indicated at 45. Thus at the requirement of the farmer, either a harrow action can be carried out on the soil previous to the packers or subsequent to the packers.

Since various modifications can be made in my invention as hereinabove described, and many apparently widely different embodiments of the same made within the spirit and scope of the claims without departing from such spirit and scope, it is intended that all matter contained in the accompanying specification shall be interpreted as illustrative only and not in a limiting sense.

I claim:

1. A harrow comprising frame means arranged for attachment to transport means whereby the frame means can be moved across the ground in a direction of movement, an elongate support member, means mounting said support member on said frame means in an orientation such that it extends transversely to the direction of motion, said mounting means being arranged to maintain said support member in said orientation on the frame means, a plurality of tine support bars each fixedly mounted on said support member in spaced relation along the elongate support member and each having one end directly attached to the support member so that an opposed free end thereof extends outwardly from the support member to define a tine supporting section, each tine supporting bar arranged at an angle different from ninety degrees to the support member and to the direction of motion, and a plurality of spring tines each comprising a flexible coiled spring portion defining an axis around which it is coiled and arranged for engaging around a respective one of the tine support sections such that the axis of the spring portion lies at said angle of said support bar, and a tine portion depending downwardly from the spring portion for engaging the ground in a harrowing action.

2. The invention according to claim 1 wherein the tine support bars each comprise a straight tube of length sufficient to receive at least one spring tine and having one end attached to said member and the other end free so that said spring tine can be passed over said free end into said support section.

3. The invention according to claim 1 wherein each support bar is arranged to receive two spring tines.

4. The invention according to claim 3 wherein said two spring tines are arranged such that the downwardly depending tine portions thereof are arranged at opposed ends of the tine support bar with the spring portions thereof leading from the downwardly depending tine portion inwardly toward a centre of said support bar.

5. The invention according to claim 1 wherein the angle of the support bars to the support member is of the order of 45°.

6. The invention according to claim 1 including means for drivingly reciprocating the support member along its length.

7. The invention according to claim 6 wherein said means for drivingly reciprocating said bar is arranged such that a length of stroke thereof is less than the distance along the support member between one tine and the next adjacent tine.

8. The invention according to claim 1 including a second support member parallel to and rearwardly of said support member having attached thereto a plurality of support bars and tines in similar configuration to those of the support member.

9. The invention according to claim 8 including means for drivingly reciprocating said support member and said second support member in directions along their length and in opposed phase.

10. The invention according to claim 1 wherein the frame means includes ground engaging wheel means for supporting said frame means and said elongate support member relative to the ground and means for adjusting the relative height of said ground engaging wheel means and said harrow tines whereby to adjust the depth of action of said harrow tines.

* * * * *